United States Patent
Liu et al.

(10) Patent No.: US 9,026,781 B2
(45) Date of Patent: May 5, 2015

(54) SYSTEM AND METHOD FOR DATA TRANSMISSION

(75) Inventors: Yong Liang Liu, Beijing (CN); Guang Hua Zhou, Beijing (CN); Yi Zhang, Beijing (CN)

(73) Assignee: Thomson Licensing, Issy-les-Moulineaux (FR)

( * ) Notice: Subject to any disclaimer, the term of this patent is extended or adjusted under 35 U.S.C. 154(b) by 454 days.

(21) Appl. No.: 12/735,247

(22) PCT Filed: Dec. 29, 2008

(86) PCT No.: PCT/CN2008/002106
§ 371 (c)(1),
(2), (4) Date: Jun. 25, 2010

(87) PCT Pub. No.: WO2009/086735
PCT Pub. Date: Jul. 16, 2009

(65) Prior Publication Data
US 2010/0287367 A1    Nov. 11, 2010

(51) Int. Cl.
*H04L 29/06* (2006.01)
*H04L 9/08* (2006.01)

(52) U.S. Cl.
CPC ........... *H04L 9/0827* (2013.01); *H04L 2209/60* (2013.01)

(58) Field of Classification Search
CPC ................................................. H04L 63/0464
USPC ......................................... 713/150, 163, 168
See application file for complete search history.

(56) References Cited

U.S. PATENT DOCUMENTS

| | | | |
|---|---|---|---|
| 6,269,445 B1 | 7/2001 | Nishioka et al. | |
| 6,463,151 B1 * | 10/2002 | Iitsuka et al. | 380/201 |
| 6,530,020 B1 * | 3/2003 | Aoki | 713/163 |
| 6,728,379 B1 * | 4/2004 | Ishibashi et al. | 380/278 |
| 7,062,045 B2 * | 6/2006 | Riddick | 380/44 |
| 7,203,311 B1 | 4/2007 | Kahn et al. | |
| 7,203,312 B1 * | 4/2007 | Hatanaka et al. | 380/201 |
| 7,457,414 B1 * | 11/2008 | Kahn et al. | 380/201 |
| 7,706,540 B2 * | 4/2010 | Fransdonk | 380/279 |
| 7,877,813 B2 * | 1/2011 | Kim et al. | 726/29 |
| 8,209,535 B2 * | 6/2012 | Lee et al. | 713/169 |
| 2001/0009006 A1 | 7/2001 | Sugahara et al. | |
| 2003/0056118 A1 | 3/2003 | Troyansky et al. | |

(Continued)

FOREIGN PATENT DOCUMENTS

| | | |
|---|---|---|
| CN | 1347225 | 5/2002 |
| EP | 1553583 | 7/2005 |

(Continued)

OTHER PUBLICATIONS

Search Rept: Mar. 5, 2009.

*Primary Examiner* — Mohammad W Reza
(74) *Attorney, Agent, or Firm* — Myers Wolin LLC

(57) ABSTRACT

A method for transmission data in a system is provided. The system includes a first device, plurality of second devices, and plurality of third devices, the method includes steps of encrypting the data with a first key and encrypting the first key with a second key at the first device, sending the encrypted data from the first device to the second device, decrypting the second key and encrypting the first key with a third key by the second device, sending the encrypted data from the second device to the third device, and decrypting the third key and the first key by the third device.

6 Claims, 6 Drawing Sheets

(56) References Cited

U.S. PATENT DOCUMENTS

| | | |
|---|---|---|
| 2003/0161476 A1 | 8/2003 | Fransdonk |
| 2004/0093494 A1 | 5/2004 | Nishimoto et al. |
| 2004/0172549 A1* | 9/2004 | Kojima et al. ............... 713/193 |
| 2005/0154905 A1 | 7/2005 | Kojima et al. |
| 2005/0182931 A1 | 8/2005 | Robert et al. |
| 2006/0004668 A1 | 1/2006 | Hamnen et al. |
| 2006/0053077 A1 | 3/2006 | Mourad et al. |
| 2006/0067529 A1* | 3/2006 | Kojima ........................ 380/201 |
| 2006/0179489 A1* | 8/2006 | Mas Ribes ..................... 726/27 |
| 2007/0092082 A1* | 4/2007 | Rush ............................. 380/277 |
| 2008/0059787 A1* | 3/2008 | Hohenberger et al. ....... 713/153 |

FOREIGN PATENT DOCUMENTS

| | | |
|---|---|---|
| JP | 1246979 | 10/1989 |
| JP | 7225550 | 8/1995 |
| JP | 9050465 | 2/1997 |
| JP | 2000215252 | 8/2000 |
| JP | 2001119357 | 4/2001 |
| JP | 2003152698 | 5/2003 |
| JP | 2005196926 | 7/2005 |
| JP | 2007181017 | 7/2007 |
| WO | WO02078238 | 10/2002 |
| WO | WO03043263 | 5/2003 |
| WO | WO2006088596 | 8/2006 |
| WO | WO2006120535 | 11/2006 |

* cited by examiner

SYSTEM AND METHOD FOR DATA TRANSMISSION

This application claims the benefit, under 35 U.S.C. §365 of International Application PCT/CN2008/002106, filed Dec. 29, 2008, which was published in accordance with PCT Article 21(2) on Jul. 16, 2009 in English and which claims the benefit of PCT International patent application No. PCT/CN2007/003958, filed Dec. 29, 2007.

TECHNICAL FIELD

This invention relates to a data transmission system and method.

BACKGROUND

Nowadays, most business entities provide their services to the end users, which lead to Business-to-Customer (B2C) transactions mode. This traditional B2B business mode cannot cater to diverse emerging applications. For example, a Content Provider intends to provide his video stream to a great number of end users, but there is no direct communication network between them. However, there is a Local Operator and there is a communication network between the Local Operator and the end users and a communication network between the Local Operator and the Content Provider. So the Content Provider can provide contents to the end users via the Local Operator. Thus a B2B2C (Business to Business to Customer) business mode occurs. However, in this business mode, a problem will arise, how to guarantee the control of the contents at the CP end and at the Local Operator end, because both entities want to get profits by controlling the contents distribution.

CONTENT OF THE INVENTION

The invention concerns a method for transmitting content data between a first device and an end user device, wherein said first device is connected to a transfer device and said transfer device is connected to said end user device. The method comprises, at the level of the transfer device, the steps of: receiving the content data encrypted ({Ecw(content)}) with a first key (CW); receiving the first key (CW) encrypted ({Esk(CW)}) with a second key (SK); receiving the second key encrypted ({Ek(cp,eu)(SK)}, {Ek(lcls,eu)(SK)}) with a first key ($k_p$(cp,eu)) for decrypting by the end user device; encrypting ({Ek(lo,eu)Ek(cp,eu)(SK)}, {Ek(lo,eu)Ek(lcls,eu)(SK)}) said second encrypted key ({Ek(cp,eu)(SK)}, {Ek(lcls,eu)(SK)}) with a second key ($k_p$(lo,eu)) for decrypting by the end user device; and transmitting, to the end user device, the encrypted content data ({Ecw(content)}), the first key encrypted with the second key ({(Esk (CW)}) and said second encrypted key encrypted with the second key for decrypting by the end user device, ({Ek(lo,eu)Ek(cp,eu)(SK)}, {Ek(lo,eu)Ek(lcls,eu)(SK)}).

In above method, the second key encrypted with the first key for decrypting by the end user device {Ek(cp,eu)(SK)} is received encrypted with a key ($k_p$(cp,lo)) for decryption by the transfer device before encryption with the second key ($k_p$(lo,eu)) for decrypting by the end user device.

In above methods, said transmitting step is performed in response to an authorization request by the end user device.

DETAILED IMPLEMENTATION

Figure 1:
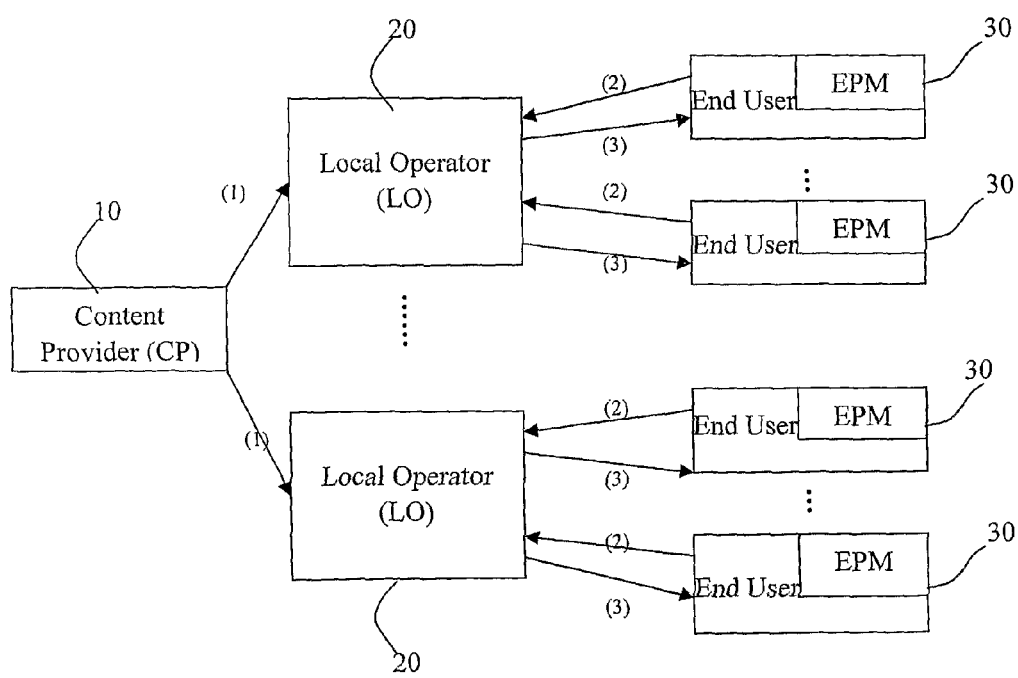
FIG. 1 shows an exemplary data transmission system structure.

FIG. 1 shows a B2B2C data transmission system according to a first embodiment. In the transmission system, there are three entities, Content Provider (CP) part 10, Local Operator (LO) part 20, and End User part 30. There are might be several Local Operators 20 and a great number of End Users 30, with one Local Operator 20 serving multiple End Users 30. Content Provider (CP) 10 distributes contents to the End Users 30 via LOs 20. The contents can be data, media streams, etc. There is an Electronic Purse Module (EPM) in each End User to pay the Content Provider 10 and the Local Operators 20.

Figure 2:
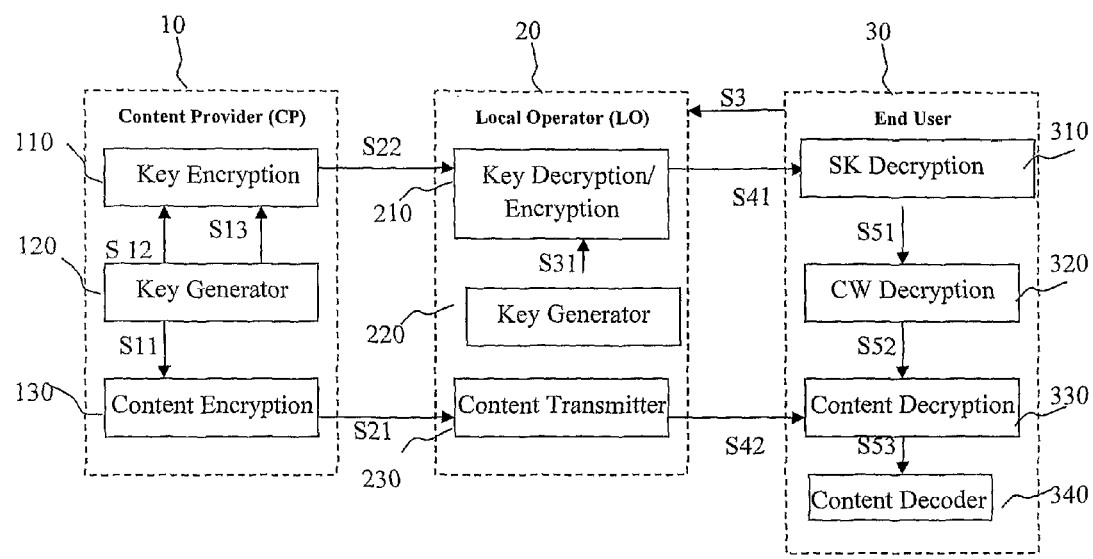
FIG. 2 shows the devices and processes in the data transmission system of FIG. 1.

FIG. 2 shows a CP 10, a LO 20, and an End User 30. Here we just use one LO and one End User as an example. In the Content Provider 10, there is a Key Encryption module 110, a Key Generator module 120, and a Content Encryption module 130. The LO 20 includes a Key Decryption/Encryption module 210, a Key Generator 220, and a Content Transmitter 230. At the End User 30, there is a SK Decryption module 310, a CW Decryption module 320, a Content Decryption module 330, and a Content Decoder 340.

In this embodiment, there are three symmetric keys k(cp, lo), k(cp, eu), and k(lo,eu), or three pairs of asymmetric keys ($k_p$(cp, lo) and $k_s$(cp, lo)), ($k_p$(cp, eu) and $k_s$(cp, eu)), and ($k_p$(lo, eu) and $k_s$(lo, eu)). When the encryption is performed by using symmetric keys, k(cp,lo) is shared between CP 10 and LO 20, k(lo,eu) is shared between LO 10 and EU 30, k(cp,eu) is shared between CP 10 and EU 30 respectively. For example, CP 10 uses k(cp,lo) to encrypt contents for LO 20, while LO 20 will use the key k(cp,lo) to decrypt and get the contents. The processes of encryption and decryption between CP 10 and EU 30 and between LO 20 and EU 30 are similar with that between the CP 10 and LO 20, which will not be described here.

When asymmetric keys are used, for example, a public key and a corresponding private key for two entities, CP 10 uses the public key $k_p$(cp, lo) to encrypt the contents for LO 20, and LO 20 uses the secret key $k_s$(cp, lo) to decrypt and get the contents. For CP 10 and EU 30, CP 10 uses the public key $k_p$(cp, eu) to encrypt and EU 30 uses the private key $k_s$(cp, eu) to decrypt. Similarly, LO 20 uses the public key $k_p$(lo, eu) to encrypt and the EU 30 uses the private key $k_s$(lo, eu) to decrypt.

Hereafter, asymmetric keys are used between entities to describe the present embodiment. With the clear contents, the CP 10 carries out the following steps: the Key Generator 120 creates Control Words (CWs), and sends the Control Words to the Content Encryption module 130 (see step S11), where these CWs are used to scramble the contents to get {Ecw (Content)}. 'E' stands for the encryption function, and 'cw' for the key used—this notation will be used in the rest of the description. Then the Key Generator 120 also creates a Service Key (SK) to encrypt the CWs and get {Esk(CW)} (see step S12). Then the Key Encryption module 110 encrypts SK with the End User's public key (called herein $K_p$(cp,eu)) to get {Ek(cp,eu) (SK)}. This process is used to protect the contents and guarantee only the End User 30 with the secret key $K_s(cp, eu)$ can access the contents, and not the Local Operator LO 20.

{Ek(cp,eu)(SK)}, possibly together with information related to the contents from CP 10, e.g. their play time, price and so on is called a license from CP 10. Then the license will be encrypted, especially {Ek(cp,eu)(SK)} will be encrypted at CP 10. {Ek(cp,eu)(SK)} is encrypted with a LO's public key to CP, called $K_p(cp,lo)$, to get {Ek(cp,lo)(Ek(cp,eu)(SK))}, (see step S13). This process is to guarantee only the LO with the key $k_s(cp,lo)$ can get {Ek(cp,eu)(SK)}. Then {Ecw(Content)} will be sent to the Content Transmitter 230 in the LO 20 via step S21. {Esk(CW)} and {Ek(cp,lo)(Ek(cp,eu)(SK))} will be sent to the Key Decryption/Encryption 210 in LO 20 via step S22. Step S21 and S22 can be at the same time or in a different sequence. The LO 20 has a secret key $K_s(cp,lo)$ distributed by the CP 10, which can decrypt {Ek(cp,lo)(Ek(cp,eu)(SK))} to get {Ek(cp,eu)(SK)}. The decryption process is carried out in Key Decryption/Encryption module 210.

When an End User wants to access the contents, it will send a request to the LO 20 via step S3, Then {Ek(lo,eu)(Ek(cp,eu)(SK))} will be sent to the SK Decryption Module 310 via step S41. The Content Transmitter 230 at LO 20 sends {Esk(CW)} and {Ecw(Content)} to the Content Decryption module 330 via step S42. Then the Key Decryption/Encryption module 210 encrypts {Ek(cp,eu)(SK)} with an End User's key $k_p(lo,eu)$ to get {Ek(lo,eu)(Ek(cp,eu)(SK))}. This process is intended to protect the {Ek(cp,eu)(SK)} so as to be accessed only by the End User 30 with a specific key $k_s(lo, eu)$.

The End User first uses the key $k_s(lo,eu)$ and $k_s(cp,eu)$ respectively issued by the LO 20 and CP 10 to get SK (step S51), then uses the SK to decrypt the {Esk(CW)}, uses the decrypted CW to decrypt the contents (step S52), and finally sends the contents in clear to the Content Decoder 340 for decoding via step S53.

In the above embodiment, the data transmission from the LO 20 to the End User 30 is made in pull mode, and each time the End User 30 requests contents from the LO, it needs to pay the CP 10 and LO 20 from its EPM. The End user mainly has three ways to get the $k_s(cp,eu)$ and $k_s(lo,eu)$: firstly $k_s(cp, eu)$ and $k_s(lo, eu)$ may be stored in the end device (e.g. a Set-Top Box), the device should be authenticated and authorized by the CP and LO; secondly, they may be stored in the End User's smartcard issued by the CP and LO; and thirdly, the End User can get the keys by downloading them from the web site after online registration with the CP and LO. In addition, the keys can also be authorized to a reliable third party by the CP and/or LO, the end user can get the keys from this third party.

Though the process among those entities is illustrated in a certain sequence, the sequence can be changed. For example, $k_p(cp, eu)$, $k_s(cp, eu)$, $k_p(cp,lo)$, $k_s(cp,lo)$, $k_p(lo, eu)$, and $k_s(cp,lo)$ can be generated first.

Figure 3:
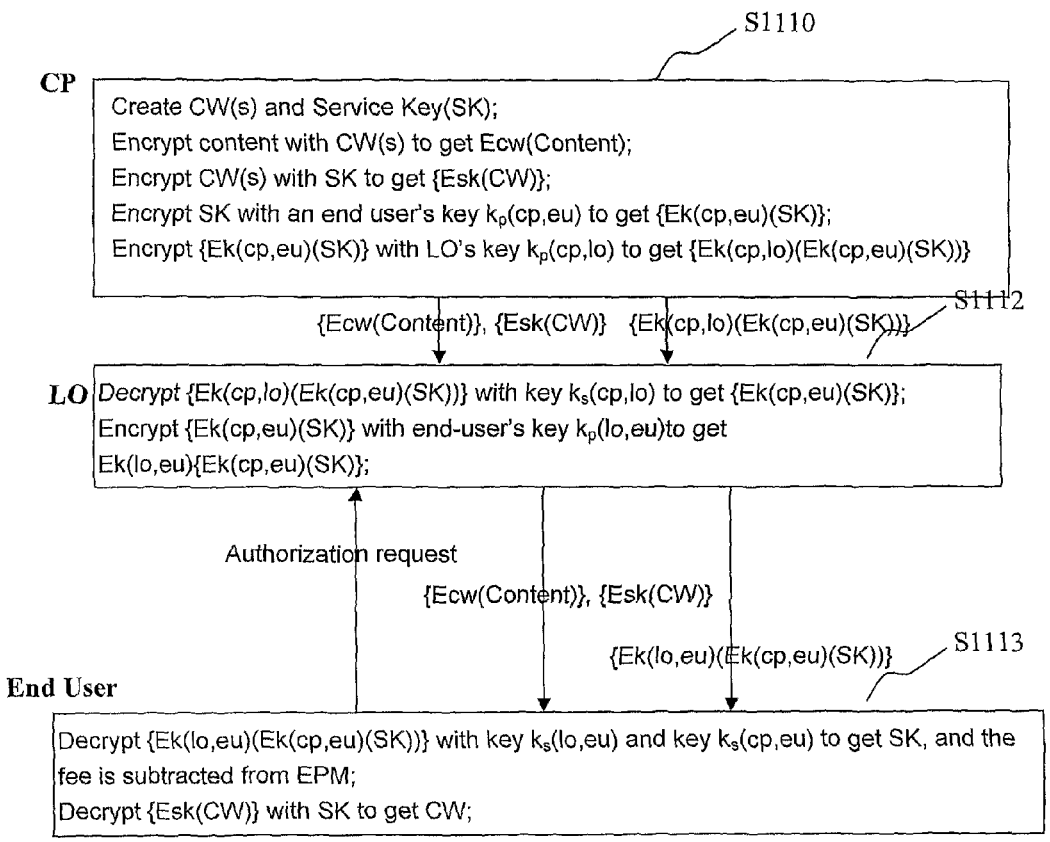
FIG. 3 shows the detailed processes at the Content Provider, the Local Operator, and the End User.

These processes are also illustrated by the diagram in FIG. 3. In FIG. 3, the processes at the CP 10 are described in S1110, the processes at the LO 20 are described in S1112, and the processes at the End User 30 are shown in S1113.

In above embodiment, all the encryption/decryption method can be Advanced Encryption Standard (AES), Rivest Shamir Adleman (RSA) encryption, and so on. Though the embodiment is based on a single LO and a single End User A, there can be plurality of LOs and End Users.

As a variation of above embodiment, when the LO receives a request from the EU for the contents, the LO just charges fee from EU's EPM and distributes the {Ek(cp,eu)(SK)} without encrypting it. In this variation, the EU only needs to get $K_s(cp, eu)$ to access the contents.

Figure 4:
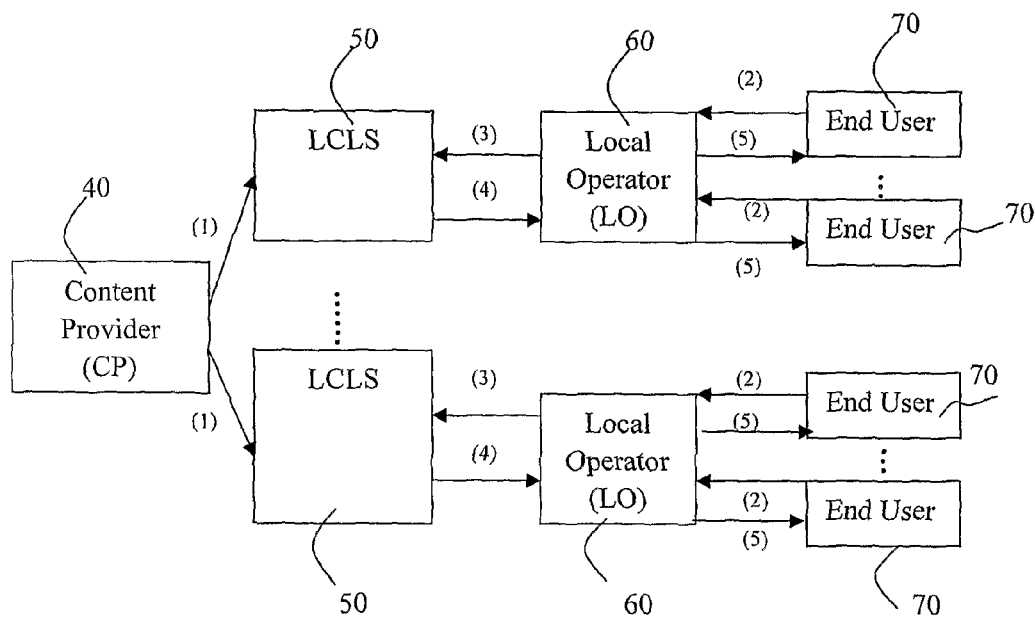
FIG. 4 shows a second exemplary data transmission system structure.

FIG. 4 shows another embodiment of the data transmission system. There is a Content Provider (CP) 40 and a plurality of Local Operators (LOs) 60. For each LO, there is a Local Central Licensing Server (LCLS) 50 communicating with the LO. Each LO 60 serves a great number of End Users 70. In this embodiment, LCLS shares tasks with CP to alleviate its burden of encryption and content distribution. In this example, a LCLS is used for a LO, however, a LCLS can serve more than one LO too.

Figure 5:
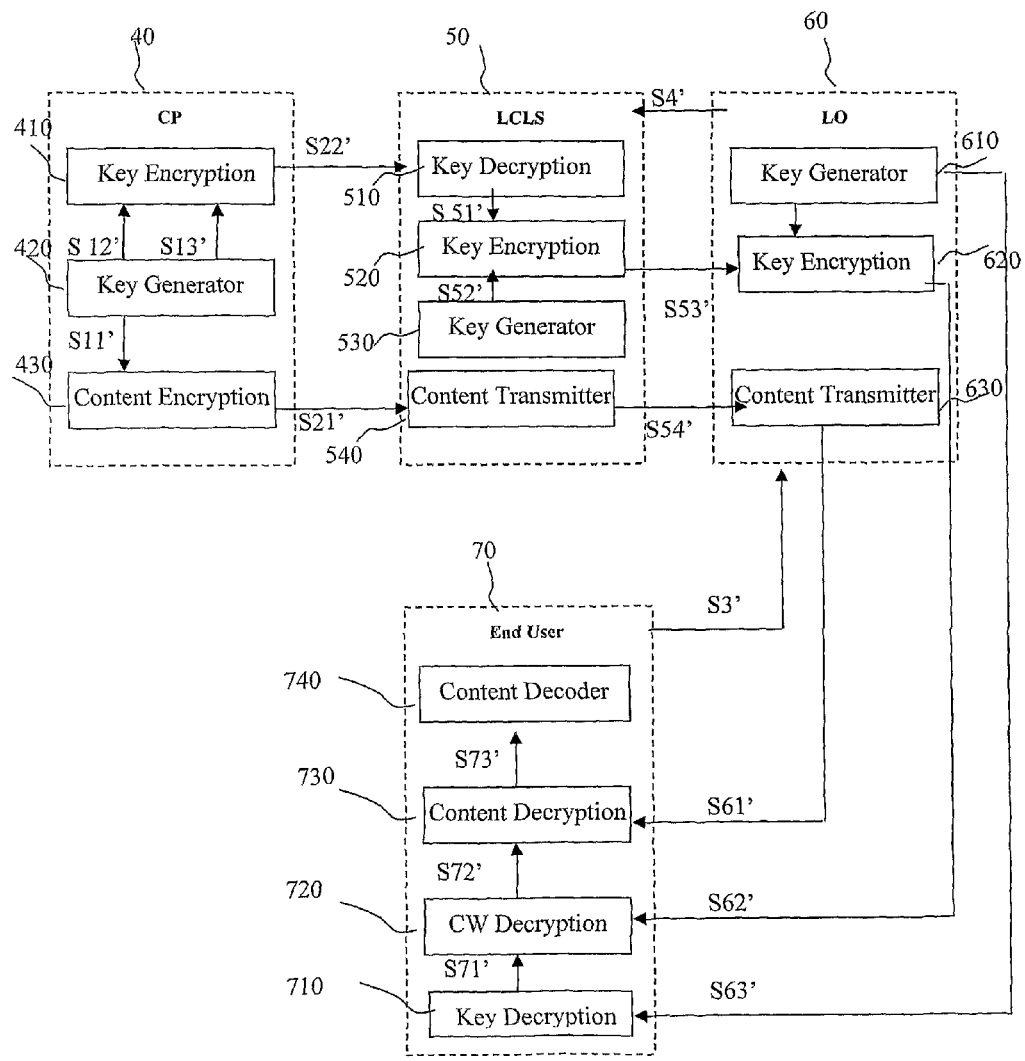
FIG. 5 shows the devices and processes in the data transmission system of FIG. 4.

The following part describes the system and method above in more detail:

FIG. 5 shows CP 40, LCLS 50, LO 60, and End User 70. At the Content Provider 40, there is a Key Encryption module 410, a Key Generator module 420, and a Content Encryption module 430. The LCLS 50 includes a Key Decryption module 510, a Key Encryption module 520, a Key Generator 530, and a Content Transmitter 540. The LO 60 includes a Key Generator 610, a Key Encryption module 620, and a Content Transmitter 630. The End User 70 includes a Key Decryption module 710, a CW Decryption module 720, a Content Decryption module 730, and a Content Decoder 740.

In this embodiment, there are three symmetric or three pairs of asymmetric keys. Here we use asymmetric keys to explain the present embodiment. Key $k_p(cp,lcls)$ and $k_s(cp, lcls)$ are shared between CP 40 and LCLS 50, $k_p(lcls, eu)$ and $k_s(lcls, eu)$ are shared between LCLS 50 and End User 70, and $k_p(lo,eu)$ and $k_s(lo,eu)$ are shared between LO 60 and End User 70 respectively.

The Key Generator 420 creates control words (CWs). Content Encryption module 430 encrypts contents (typically Video on Demand contents such as MPEG II compliant files) with the CWs in order to obtain the encrypted content {Ecw(Content)} (see step S11'). The Key Generator 420 further generates SK and sends this key to the Key Encryption module 410 where the Key Encryption module 410 encrypts CWs with SK to generate encrypted control words {Esk(CW)} (see step S12'). The Key Generator 420 generates a key $k_p(cp,lcls)$ for the LCLS and sends the key to the Key Encryption module 410 to encrypt the SK so that {Ek(cp,lcls)(SK)} is generated (see step S13'). LCLS's key k(cp,lcls) is a key between the CP 40 and LCLS 50.

Then {Ecw(content)} and {Esk(CW)} is sent from the Content Encryption module 430 to the Content Transmitter 530 via step S21'. {Ek(cp,lcls)(SK)} is transmitted from the Key Encryption module 410 to the Key Decryption module 510 via step S22'. The Key Decryption module 510 decrypts the {Ek(cp,lcls)(SK)} with the key provided by the CP 40 to get SK and saves SK in step S51'.

Optionally, LCLS can use SK to decrypt the {Esk(CW)}, and then use CW to decrypt the {Ecw(Content)} to get Content, then according to LO's requirement. LCLS can also re-edit the content, and then re-encrypt the content and CW to get {E'cw(Content)} and {E'sk (CW)}, the CW and SK need not to be the same with which one decrypted form {Esk(CW)} and {Ek(cp,lcls)(SK)}.

When an End User 70 sends a request for contents to the LO (step S3'), LO 60 will forward the request to the LCLS 50 (step S4'). After the LCLS 50 receives the request, it will encrypt SK with the End User's key $k_p(lcls, eu)$ to get {Ek(lcls, eu)(SK)} by the Key Encryption module 520. And then the Key Encryption module 520 sends {Ek(lcis,eu)(SK)} to the Key Encryption 620 via step S53'. {E'cw(Content)} and {E'sk(CW)} are also sent from the Content Transmitter 530 to the Content Transmitter 630 via step S54'. In this way, LCLS can share the encrypting tasks. CP need not consider the key encryption for the EU and just produces the contents, e.g. video/audio streams and encrypts the contents.

At the LO side, the Key Encryption 620 encrypts the {Ek(lcls, eu)(SK)} with the End User's public key $k_p$(lo, eu) to generate EK(lo,eu){Ek(lcls,eu)(SK)} and sends it to the Key Decryption module 710 at the End User 70 via step S63'. {E'cw(Content)} and {E'sk(CW)} are sent to the Content Decryption module 730 and the CW Decryption module 720 respectively via step S61' and step S62'.

The steps S61', S62', and S63' can be performed in different orders.

The End User uses its secret keys, $k_s$(lcls,eu) and $k_s$(lo,eu) to decrypt SK from {Ek(lo,eu)(Ek(lcls,eu)(SK))} by the SK Description module 730, and sends the decrypted result to the CW Decryption module 720 during step S71'. The End user has three ways to get the $k_s$(lcls,eu) and $k_s$(lo,eu): firstly $k_s$(lcls, eu) and $k_s$(lo, eu) may be stored in the end device like Set-Top Box, the device should be authenticated and authorized by the LCLS and LO; secondly, they may be stored in the End User's smartcard issued by the LCLS and LO; and thirdly, the End User can get the keys by downloading from the web site after online registration with LCLS and LO.

Then the CWs are decrypted by SK by the CW Decryption module 720 and sends the result to the Content Decryption module 730 during step S72'. The content, decrypted using CW, will be decoded by the Content Decoder Module 740.

Figure 6:
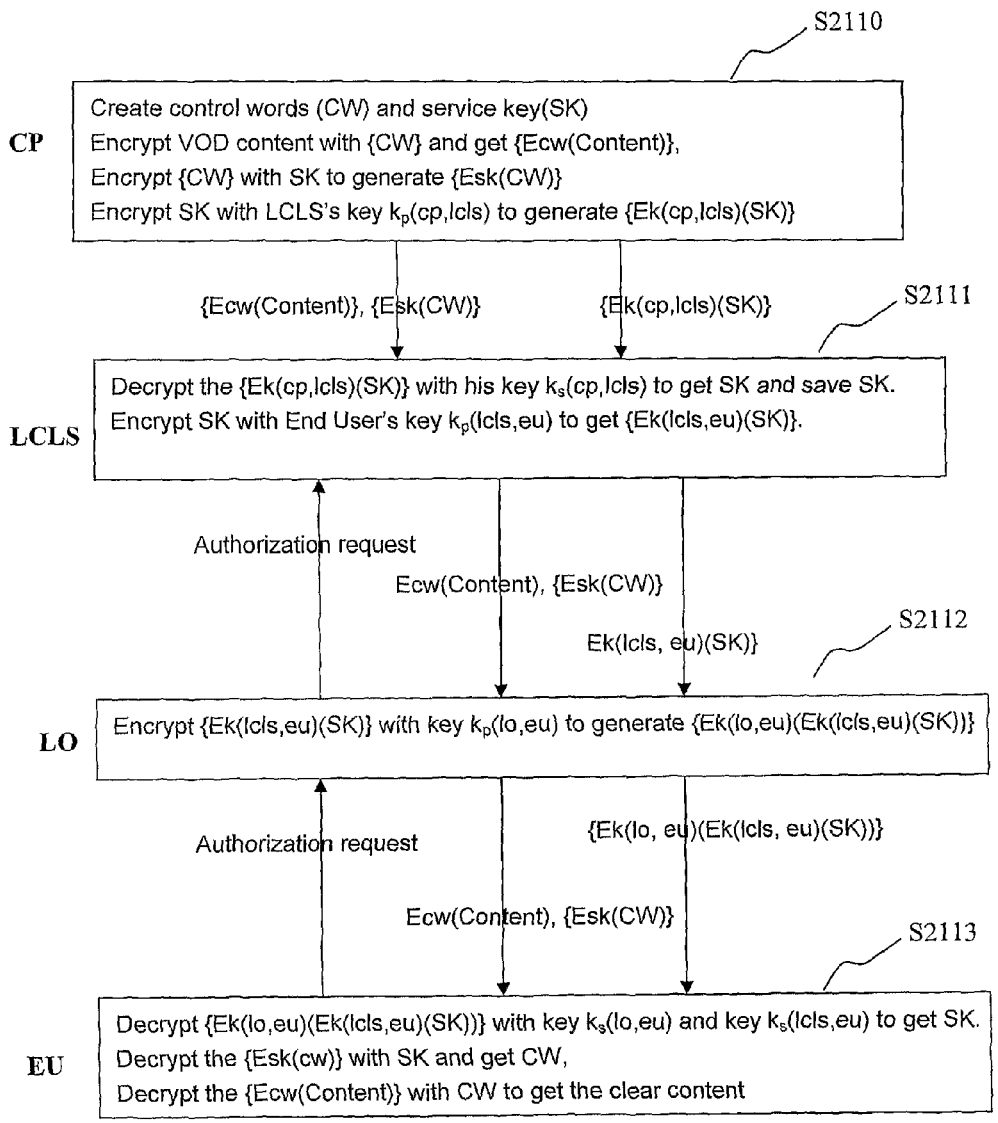
FIG. 6 shows the detailed processes at the Content Provider, the Local Central Licensing Servers the Local Operators, and the End Users.

FIG. 6 illustrates the detailed processes at the CP (S2110), LCLS (S2111), LO (S2112), and End User (S2113).

During step S2110, the CP Creates video/audio contents and uses Control Words (CW) to scramble the contents and gets {Ecw(Content)}. Then the CP uses a Service Key (SK) to encrypt the CW and gets {Esk(cw)}. Afterwards, the SK is encrypted with a key $k_p$(cp,lcls) to get {Ek(cp,lcls)(SK)}. Then the CP distributes {Ecw(Content)}, {Esk(cw)} and {Ek(cp,lcls)(SK)} to the LCLS. At step S2111, LCLS decrypts {Ek(cp,lcls)(SK)} with $K_s$(cp, leis) and gets SK and saves it. Further the LCLS encrypts SK with End User's public key $k_p$(lcls,eu) to get {Ek(lcls,eu)(SK)}. At LCLS, it can also modify the content and use the CW to scramble the contents and get {E'(content)}. Then the CW is encrypted by SK.

When an EU sends a request to LO for a certain contents, LO forwards the request to the LCLS. The EU may know the information about the contents via a network station and knows how to request the contents. When LCLS receives the request, during step S2112, it will charge a certain fee from the EU's EPM and send {Ek(lcls, eu)(SK)}, {Esk(CW)} to LO. At LO, {Ek(lcls,eu)(SK)} is encrypted with an EU's public $k_p$(lcls, eu) to generate {Ek(lo, eu)(Ek(lcls, eu)(SK))}. And after LO charged fee from EU's EM, Esk (Content), {Esk(CW)}, and {Ek(lo, eu)(Ek(lcls, eu)(SK))} are sent to the EU.

At the EU, it decrypts {Ek(lo,eu)(Ek(lcls,eu)(SK))} with key $k_s$(lo,eu) and key $k_s$(lcls,eu) to get SK. Afterwards, {Esk(cw)} is decrypted by SK and CW is got. Finally, {Ecw(Content)} is decrypted with CW to get the clear contents. And then the EU can access the contents.

The second solution adds LCLS, while it provides more flexibility to re-edit and schedule the Contents.

A number of implementations have been described. Nevertheless, it will be understood that various modifications may be made. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the following claims.

The invention claimed is:

1. A method for transmitting content data between a first device and an end user device, wherein said first device is connected to a transfer device and said transfer device is connected to said end user device, said method comprising, at the level of the transfer device:
    receiving the content data encrypted with a first key;
    receiving the first key encrypted with a second key;
    receiving the second key encrypted with a third key for decrypting by the end user device;
    encrypting said second encrypted key with a fourth key for decrypting by the end user device;
    transmitting, to the end user device, the encrypted content data, the first key encrypted with the second key and said second encrypted key encrypted with the fourth key for decrypting by the end user device.

2. The method according to claim 1, wherein the second key encrypted with the third key for decrypting by the end user device is received encrypted with a fifth key for decryption by the transfer device before encryption with the fourth key for decrypting by the end user device.

3. The method according to claim 1, wherein said transmitting is performed in response to an authorization request by the end user device.

4. A transfer device connected to a first device and an end user device for transmitting content data between said first device and said end user device, said transfer device comprises:
    a memory; and
    a processor configured to:
    receive the content data encrypted with a first key;
    receive the first key encrypted with a second key;
    receive the second key encrypted with a third key for decrypting by the end user device;
    encrypt said second encrypted key with a fourth key for decrypting by the end user device;
    transmit, to the end user device, the encrypted content data, the first key encrypted with the second key and said second encrypted key encrypted with the fourth key for decrypting by the end user device.

5. The transfer device according to claim 1, wherein the processor configured to: receive the second key encrypted with the third key for decrypting by the end user device which is encrypted with a fifth key for decryption by the transfer device before encryption with the fourth key for decrypting by the end user device.

6. The transfer device according to claim 1, wherein the processor configured to: perform said transmitting in response to an authorization request by said end user device.

* * * * *